Patented Aug. 17, 1954

2,686,766

UNITED STATES PATENT OFFICE 2,686,766

NONFOAMING SYNTHETIC RUBBER EMULSION PAINT COMPOSITION

Robert M. Silverstein, Aloysius P. Brady, and Arthur G. Brown, Menlo Park, Calif., assignors to El Dorado Oil Works, a corporation of California No Drawing. Application October 6, 1952, Serial No. 313,353

15 Claims. (Cl. 260—23.7)

This invention relates to defoaming agents for water emulsion paints, to a method of preventing water emulsion paints from foaming and for an improved water emulsion paint having superior antifoaming qualities.

Water emulsion paints have recently come into prominence because of their many desirable properties, such as ease of application, lack of brush marks, speed of drying, lack of fire hazard, lack of odor, and the fact that brushes and the like can be cleaned with ordinary soap and water. Such water emulsion paints ordinarily consist of a colloidal dispersion of a synthetic rubber in water. This colloidal dispersion of latex is most frequently made of a high styrene-butadiene polymer but it may consist of other synthetic rubbers such as plasticized styrene and may contain other resins such as an alkyd resin. Such paints are known as synthetic latex water emulsion paints and are ordinarily referred to as emulsion paints.

Despite the many desirable properties of the water emulsion paints, they have had one drawback. This is the fact that such paints tend to form small bubbles as they are applied and the bubbles are frequently sufficiently stable so that the paint dries before the bubbles collapse, thus leaving an uneven surface and one which can be easily injured by abrasion. Thus, when such a paint is applied with a roller or brush, there is a tendency to work air into the paint producing bubbles which detract from the appearance and the permanence of the paint. Although several agents have been proposed for overcoming this tendency none have been completely successful. The problem is primarily brought about by the very nature of the paint. In other words, the dispersing agents used to disperse the synthetic rubber in the paint themselves act as foaming agents. Thus, the problem is not only one of finding an agent that will prevent the paint from foaming but also finding an anti-foaming agent which will not interfere with the emulsifier in the paint and cause the dispersion to be coagulated.

It is therefore an object of this invention to provide an improved synthetic latex water emulsion paint which has little tendency to form foam.

Another object of the present invention is to provide a method of treating water base emulsion paints to prevent them from foaming.

In general, the objects of the present invention are achieved by utilizing a fatty acid ester of a polyhydroxy alcohol as hereinafter defined.

The polyhydroxy alcohols which have been found suitable for use in the present invention are tetramethylolcyclohexanol, pentaerythritol, dipentaerythritol and tripentaerythritol. These alcohols are esterified with fatty acids as hereinafter described in detail. The polyhydroxy alcohols enumerated are typical of those suitable for use in the present invention but the invention is not limited to these particular alcohols. Other polyhydroxy alcohols prepared by the condensation of formaldehyde on the alpha carbon atom of an aldehyde, or upon both of the alpha carbon atoms of ketones are suitable for use in the present invention.

The acids used in forming the esters of the present invention comprise the fatty acids. Those having from 2 to 18 carbon atoms may be used in carrying out the invention and it is preferred to use those having from 12 to 18 carbon atoms. Typical acids which may be used include the following non-limiting examples:

Caprylic, capric, lauric, palmitic, linoleic, oleic, stearic, butyric, isovaleric, caproic, myristic, arachidic, 9,10-decylenic, 9,10-dodecylenic, petroselinic, vaccenic, eleostearic, licanic, cyclopentane carboxylic, 3 - methylcyclopentylacetic, 4-methylcyclohexane carboxylic, 2-ethyl hexoic, 2-methyl hexoic, 2-ethyl pentoic and the like.

The acids used need not be in the pure form and mixtures of acids may advantageously be used in carrying out the present invention. For instance, one particularly suitable combination of acids are the fatty acids as naturally occur in coconut oil. The coconut oil fatty acids consist of about 44% lauric, 16% myristic, 10% palmitic, 10% caprylic, 10% capric and minor amounts of other acids.

The compounds which are included in this invention exhibit marked defoaming characteristics in synthetic rubber latex base water emulsion paints. In all the samples of paint we have examined, these new compounds in concentrations of between 0.05% and 1.0% by volume, reduce bubble lifetime to an order of magnitude of about one second. The untreated paints have bubble lifetimes of more than 600 seconds. In the paint samples to which these compounds were added, it was found to be extremely difficult to produce bubbles. It was also found that the defoaming properties of the compounds were improved by an alkali treatment following the esterification.

Commercial grades of tetramethylolcyclohexanol, pentaerythritol, dipentaerythritol and tripentaerythritol and mixtures thereof over wide proportions may be used. The preferred average degree of esterification in the case of tetramethylolcyclohexanol and pentaerythritol ranges from the diester to the tetraester and in the case of dipentaerythritol, it ranges from the diester to the hexaester. In the case of tripentaerythritol, the preferred average degree of esterification ranges from the diester to the octaester. It is, of course, understood that mixtures of esters ordinarily result during the esterification. Ordinarily the isolation of pure compounds is not warranted for commercial use.

With each of these alcohols, esterification may be carried out by any of the standard procedures. Thus, the alcohols may be reacted directly with fatty acids, transesterified with fatty acid esters (including glycerides), or reacted with acid chlorides or anhydrides. Catalysts are not always necessary, but the usual types of catalysts, consisting of either acidic or basic compounds may be used.

We have found that the preferred concentrations of these defoaming agents in synthetic rubber latex base water emulsion paints ranges from 0.05% to 1.0% by volume. The defoaming agent may be incorporated directly into the paint with a suitable mixing device, or the defoamer may be diluted with a suitable liquid and the resulting dispersion or solution added to the paint. Two liquids, among others, found to be satisfactory for this purpose are pine oil and water. It was found also that treatment of 100 grams of the ester with from 0.1 to 4.0 ml. of a 25% sodium hydroxide solution definitely improves the defoaming properties of the product. This treatment serves to incorporate soap particles into the ester mixture. This apparent anomoly of suds-forming soap improving the defoaming characteristics is not thoroughly understood, but the fact of improvement of the defoaming characteristics by the soap particles incorporated into the defoaming compound by its treatment with sodium hydroxide is thoroughly established.

Instead of adding sodium hydroxide to the ester as described, one may also use sodium hydroxide in performing the esterification reaction which will cause some soap particles to be formed along with the ester. The final product is then used without making an attempt to remove the soap therefrom and substantially the same results can be obtained.

Although the method of preparing the esters forms no part of the present invention, the esterification reactions are described since the esters are not readily available as ordinary articles of commerce.

Tetramethylolcyclohexanol polylaurate

In the preparation of tetramethylolcyclohexanol polylaurate, 11.0 grams (0.05 mol) of tetramethylolcyclohexanol is mixed with 42.8 grams (0.2 mol) of methyl laurate. Then approximately 0.14 gram of sodium hydroxide is added, and the mixture heated in a flask fitted with a condenser and a receiver for collecting and measuring the methyl alcohol formed in the reaction. The temperature of the mixture should be maintained at between 200–225° C. for about 4½ hours, resulting in the collection of 6.5 ml. of distillate (methyl alcohol). The remaining product is filtered, yielding about 45.8 grams of a yellow viscous oil, $n_D^{25}$ 1.4619. The product is a mixture, the average composition of which is the triester.

Pentaerythritol polyoleate

In the preparation of pentaerythritol polyoleate, 3.4 grams (0.025 mol) of pentaerythritol is mixed with 34.1 grams (0.01 mol) of butyl oleate and ½ pellet (approximately 0.07 gram) of sodium hydroxide. The mixture is heated in a flask fitted with a condenser and receiver and the temperature maintained at between 230–275° C. for about 2½ hours. The product is of a soft gelatinous nature.

Pentaerythritol esters of coconut fatty acids

Pentaerythritol is reacted with the mixed methyl esters of coconut fatty acids in the proportion of 6.8 grams (0.05 mol) of pentaerythritol to 60 grams of the mixed methyl esters. The esters contained the fatty acids in approximately the same proportions as coconut oil. This mixture is heated as before in a flask fitted with a condenser and receiver and the temperature maintained between 245–280° C. for approximately 1½ hours. Forty grams of the product is then stirred on a steam bath for about 1 hour with 1 ml. of a 25% solution of sodium hydroxide. The product is a semi-solid mass.

Dipentaerythritol polylaurate

In the preparation of a defoaming agent from dipentaerythritol, 5.07 grams (0.025 mol) of dipentaerythritol is mixed with 32.1 grams (0.15 mol) of methyl laurate and approximately 0.07 gram of sodium hydroxide. This mixture is heated in a flask fitted with a condenser and receiver and the temperature maintained at between 230–280° C. for approximately 2 hours.

Tripentaerythritol polylaurate

For the preparation of tripentaerythritol polylaurate, 9.3 grams (0.025 mol) of tripentaerythritol is mixed with 42.8 grams (0.2 mol) of methyl laurate and ½ pellet (approximately 0.07 gram) of sodium hydroxide. The mixture is heated in a 100-ml. flask fitted with a condenser and receiver, and the temperature is maintained at between 200–270° C. for approximately 2 hours. The product is a turbid liquid.

In order to test the present invention and to show the effectiveness of the compounds in preventing foam, the following tests were made. In each test a conventional synthetic rubber water emulsion paint was used containing the following ingredients in the approximate percentages given:

| Ingredients | Percent by Wt. |
| --- | --- |
| Titanium Dioxide (Rutile) | 22.50 |
| Lithopone | 6.44 |
| Mica (325 Mesh, Wet Ground) | 3.21 |
| Lecithin (Water Dispersible) | 0.17 |
| Water (Soft) | 17.09 |
| Casein (15% Aqueous Solution) | 7.06 |
| Dowicide A/G (1:) (15% Aqueous Solution) | 3.32 |
| Dow Latex 762-K (48% Solids) | 40.21 |
| | 100.00 |

In the above table, Dowicide A/G is a phenolic preservative and is added to prevent spoilage. The Dow Latex 762-K is a colloidal dispersion of a high styrene-butadiene polymer in water. The dispersion contains about 40% solids, has a particle size of from 0.2 to 0.3 microns and the particles carry a negative charge. In each instance, this composition was used as the test material although it will be noted from the table that follows that the results on the control samples vary slightly in various tests. The slight variation in bubble time is caused by different lots of paint being used and the tests being conducted at different ambient temperatures.

In evaluating the paint samples, two tests were used. In the first test, the prepared paint sample was applied to a standard board with a commercial roller and the results were evaluated as poor to good depending on the appearance of the dried paint film. In the second test, the bubble lifetime was measured. This was done by releasing a single bubble of air beneath the surface of a sample of the paint and measuring the length of time the bubble remained in the sample. Obviously, a short lifetime of the bubble would indicate little tendency of the paint to foam while on the other hand, if the bubble persisted for a long time it would indicate that the paint would tend to foam.

In each instance, a quantity of defoaming agent as set forth in Table I was stirred into a sample of the paint described above and tested. The following test results were obtained:

*Table I*

| Compound | Conc., percent by value | Board test | Bubble Lifetime, seconds | Control (no defoamer) Board test | Bubble Lifetime, sec. |
|---|---|---|---|---|---|
| Tetramethylolcyclohexanol polylaurate | .01 | good | 5, 1, <1, 2 <1 <1 | very poor | >600 |
| Do | .05 | very good | 1 (20 bubbles) | do | >600 |
| Pentaerythritol polylaurate | .05 | do | 10, <1 (5 bubbles) 14, 1 | do | 300, 315, 405 |
| Tripentaerythritol polylaurate | .05 | good | 30, 1 (7 bubbles) 3, 25 | do | >600 |
| Pentaerythritol esters of coconut fatty acids | .05 | fair | 55, 55 | do | >600 |
| Pentaerythritol esters of coconut fatty acids with 1 ml. 25% NaOH per 40 g. | .05 | very good | <1 (25 bubbles) | do | >600 |

This application is a continuation in part of our application Serial No. 231,046 filed June 11, 1951, now abandoned.

We claim:

1. As a new composition of matter, a synthetic rubber latex base water emulsion paint containing from about 0.05 to 1% volume of a defoaming agent consisting of an alcohol selected from the group consisting of tetramethylolcyclohexanol, pentaerythritol, dipentaerythritol and tripentaerythritol esterified only with an acid selected from the group consisting of alkanoic and alkenoic monocarboxylic fatty acids having from two to eighteen carbon atoms and mixtures thereof.

2. The composition of claim 1 to which has been added a small amount of sodium hydroxide.

3. The composition of claim 1 wherein the fatty acid has from 12 to 18 carbon atoms.

4. As a new composition of matter, a synthetic rubber latex base water emulsion paint containing from about 0.05 to about 1% by volume of pentaerythritol esterified only with coconut oil fatty acids.

5. The composition of claim 3 containing a small amount of sodium hydroxide.

6. As a new composition of matter, a synthetic rubber latex base water emulsion paint containing from about 0.5 to 1% by volume of tetramethylolcyclohexanol esterified only with lauric acid.

7. As a new composition of matter, a synthetic rubber latex base water emulsion paint containing from about 0.5 to 1% by volume of pentaerythritol esterified only with lauric acid.

8. As a new composition of matter, a synthetic rubber latex base water emulsion paint containing from about 0.05 to 1% by volume of tripentaerythritol esterified only with lauric acid.

9. As a new composition of matter, a synthetic rubber latex base water emulsion paint containing from about 0.5 to 1% by volume of dipentaerythritol esterified only with lauric acid.

10. The method of reducing the foaming tendencies of a synthetic rubber latex base water emulsion paint comprising adding thereto from 0.05% to 1% by volume of a defoaming agent consisting of an alcohol selected from the group consisting of tetramethylolcyclohexanol, pentaerythritol, dipentaerythritol and tripentaerythritol esterified only with an acid selected from the group consisting of alkanoic and alkenoic monocarboxylic fatty acids having from two to eighteen carbon atoms and mixtures thereof.

11. The method of reducing the defoaming tendencies of a synthetic rubber latex base water emulsion paint comprising adding thereto from 0.05% to 1% by volume of pentaerythritol esterified only with coconut oil fatty acids.

12. The method of reducing the defoaming tendencies of a synthetic rubber latex base water emulsion paint comprising adding thereto from 0.05% to 1% by volume of tetramethylolcyclohexanol esterified only with lauric acid.

13. The method of reducing the defoaming tendencies of a synthetic rubber latex base water emulsion paint comprising adding thereto from 0.05% to 1% by volume of pentaerythritol esterified only with lauric acid.

14. The method of reducing the defoaming tendencies of a synthetic rubber latex base water emulsion paint comprising adding thereto from 0.05% to 1% by volume of tripentaerythritol esterified only with lauric acid.

15. The method of reducing the defoaming tendencies of a synthetic rubber latex base water emulsion paint comprising adding thereto from 0.05% to 1% by volume of dipentaerythritol esterified only with lauric acid.

References Cited in the file of this patent

UNITED STATES PATENTS

| Number | Name | Date |
|---|---|---|
| 2,345,528 | Bradley | Mar. 28, 1944 |
| 2,346,928 | Lighthipe | Apr. 18, 1944 |
| 2,610,964 | Ewart et al. | Sept. 16, 1952 |